Feb. 6, 1934.    W. B. WHITE    1,945,582
SELF SHARPENING LAWN MOWER
Filed Oct. 3, 1932
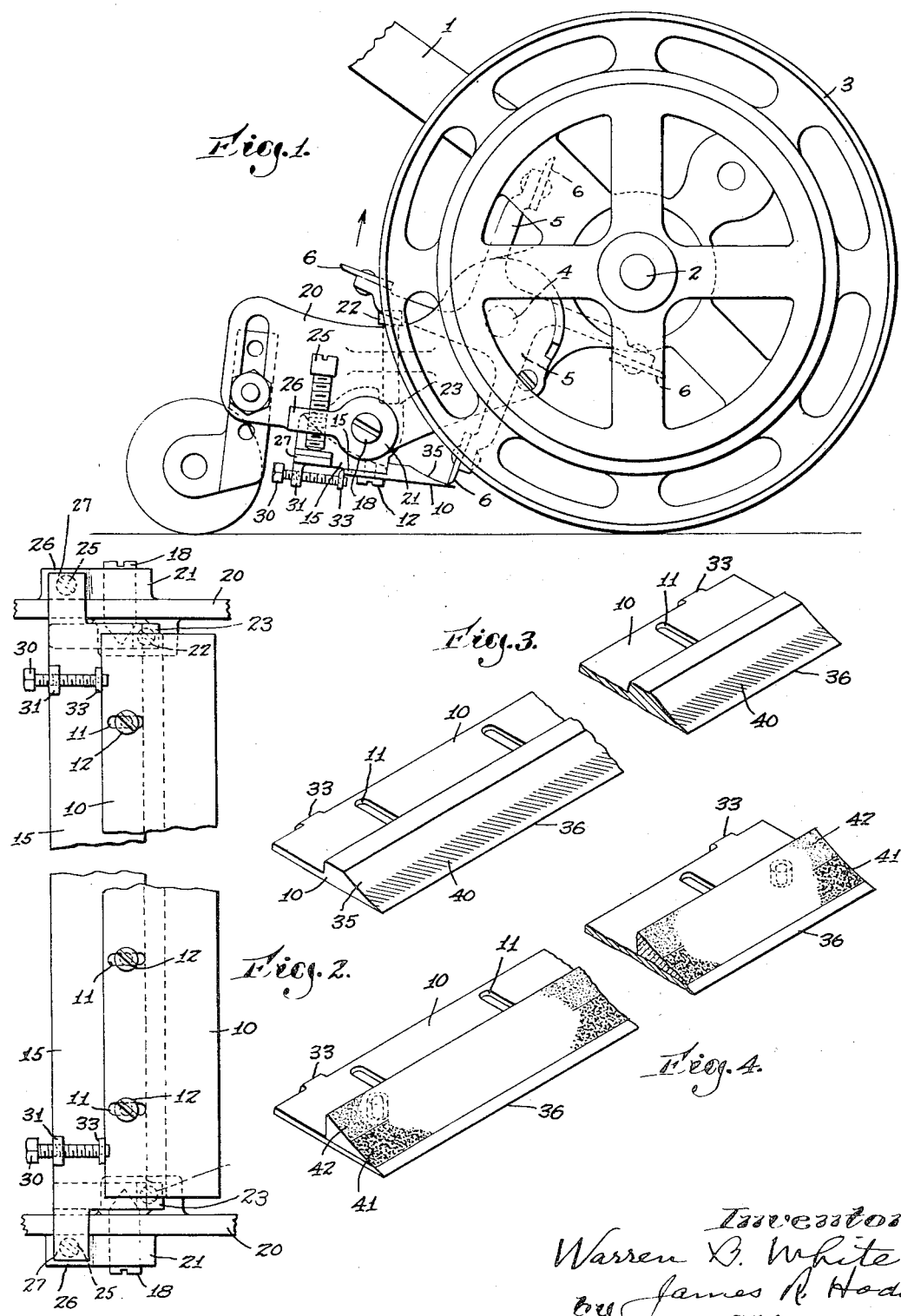

Patented Feb. 6, 1934

1,945,582

UNITED STATES PATENT OFFICE 1,945,582

SELF-SHARPENING LAWN MOWER

Warren B. White, North Abington, Mass.

Application October 3, 1932. Serial No. 636,067

1 Claim. (Cl. 56—250)

My present invention is a novel and improved construction of lawn mower, wherein means are provided which will automatically and adjustably insure the predetermined sharpening of the blades during use.

Heretofore, it has been customary to apply or affix to the well-known types of lawn mowers, having revolving cutter blades and a fixed cutter bar, separate sharpening devices. These have usually comprised attachments carrying sharpening stones or the like, which were thrust into or out of position as desired and required various attaching brackets and other members to permit the sharpening elements to be fitted in position, trued up, and aligned with the cutting blades, and then adjusted and thereafter removed.

My present invention eliminates the separate attaching and adjusting devices as heretofore employed, and I provide a novel, efficient, and constantly operating sharpening element or elements which may be continually employed to effect the sharpening operation and, furthermore, which will be capable of alignment with the stationary cutting bar and, in fact, may constitute a part or portion of such cutting bar. Thus, I am enabled to provide a simple, efficient, and extremely strong construction of self-sharpening elements, utilizing present standard methods of adjusting both angularly and radially the stationary cutter bar to also effect the adjustment of my sharpening elements.

Furthermore, I may utilize the cutter bar either with or without the sharpening element or elements, and may effect adjustments of the cutter bar so as to bring the sharpening elements into or out of action with the rotating blades by the usual adjusting instrumentalities.

Further advantages, novel combinations of parts, and details of construction will be hereinafter more fully pointed out and claimed.

Referring to the drawing illustrating a preferred embodiment of my invention.

Fig. 1 is a side view of a standard type of lawn mower construction;

Fig. 2 is a fragmentary longitudinal plan of the stationary cutting bar;

Fig. 3 illustrates in perspective one form of my self-sharpening device, and

Fig. 4 illustrates also in perspective a modified form.

Referring to the drawing, any usual type of lawn mower structure can be utilized in carrying out my invention wherein the push bar 1, suitably attached—usually through a forked bracket—is utilized to propel force to the axle 2 on which a pair of wheels 3, one only being shown in the drawing, are attached, rotation of the wheels effecting rotation of the spiral cutting members mounted on a shaft 4 and carried by arms 5, both shown in dotted lines, Fig. 1. The cutters 6—6 are attached to the arms 5, and are usually of spiral formation, striking the stationary cutting bar in the usual manner. Instead of the usual straight cutting bar, I apply my novel form of combined cutting and sharpening member 10.

This bar 10 is attached by a series of bolts 12 passing through slots 11 in the cutting bar 10 and engaging tapped recesses in the cross member 15. This cross member is mounted on pivots 18, 18, at each end of a rearwardly extending frame 20, said frame being formed with bearing portions 21 therefor. The cross member 15 is adapted to oscillate on the pivots 18 and to be held locked in adjusted position by opposite thrusting nuts 22, shown in dotted line, bearing against a shoulder 23 at each end of the cross member and corresponding thrusting nuts 25, threaded through a lug 26 on the hub portion 21 and against a laterally extending wing 27 on the member 15, as will be readily understood.

The manipulation of these thrusting nuts holds the member 15 and consequently the bar 10 in desired adjustment to be engaged by the spiral cutter 6 during the rotation of the same. In order to secure a forward and back adjustment also of the bar 10, I provide a pair of adjusting bolts 30 threaded through lugs 31 on the member 15 and each engaging a flange 33 at the rear of the bar 10, thus permitting a forward and back movement of the bar when the retaining bolts are loosened sufficiently to permit the same, whereupon the latter are tightened.

My novel form of combined cutting bar and sharpening member 10 has the forward portion formed in an arc corresponding to that in which the blades 6 travel, as indicated at 35. This arc and the edge 36 of the bar 10 are thus engaged by the spiral cutter 6, and I form my sharpening means or elements in this arc and preferably on the same, as for example, as illustrated in Fig. 3 at 40.

In this particular form the combined cutting bar and sharpening element are of the same material, preferably hardened steel with a file-like or abrading surface 40 formed thereon, thus effecting the automatic sharpening action on the cutter. The adjustment as above described effects the pressure desired or compensates for wear.

As shown in Fig. 4, I have illustrated my cutting bar 10 with two sharpening elements, the first or roughing cutter sharpener positioned just back of the straight edge 36, and may consist of a heavy abrading substance 41, the second and adjacent surface being a finer or finishing abrading section 42. These sharpening surfaces may be formed directly on the sharpener during the process of manufacture, or otherwise, or of course may be emery paper or similar abrading elements attached thereon, the sharpening surfaces being preferably, and as herein shown, a part of the member 10 and preferably integral with the straight shearing blade 36, being attachable to or adjustable by the bolts 12 and adjusting screws 30 as already explained. Thus, these abrading surfaces constitute a continuous effective sharpening of the moving blade immediately after each blade-cutting action and are always in service during the continuous operation of the machine.

It will thus be seen that I have devised an automatic self-sharpening construction for lawn mowers, preferably by utilizing a combined straight cutter and sharpening element in one device, either with or without the sharpening elements removable, and either with or without the same as a single sharpening element, or with sharpening means of varying degrees, such as a first roughing member, and a second finer or finishing member. I believe that this arrangement, whereby I obtain the benefit of a constant sharpening action and also utilize the present strong rigid structure carrying the cutter bar and having the capacity for adjustment as a part of my sharpening element, is distinctly new and I wish to claim the same herein broadly.

I also believe that the utilization of a combined member which is both a cutter or shearing bar for the spiral or movable cutters, and also the element for sharpening the same, thus securing the benefit of simultaneous adjustment of both features by the adjusting and locking bolts and devices is new and I wish to claim the same broadly.

I claim:

A self-sharpening lawnmower having a plurality of rotary cutting blades and a fixed adjustable straight shearing blade, said shearing blade having a substantial face portion in the arc of the line of travel of the rotary cutters, and means on said face to effect a continual sharpening action on the rotary blades during the operation of the lawnmower.

WARREN B. WHITE.